Patented Apr. 1, 1924.

1,488,571

UNITED STATES PATENT OFFICE.

FOORD VON BICHOWSKY, OF SAN FRANCISCO, CALIFORNIA.

PROCESS OF PREPARING ETHYLENE FORMOCHLORHYDRIN.

No Drawing. Application filed August 20, 1918. Serial No. 250,701.

*To all whom it may concern:*

Be it known that I, FOORD VON BICHOWSKY, a citizen of the United States, and a resident of San Francisco, in the county of San Francisco and State of California, have invented certain new and useful Improvements in Processes of Preparing Ethylene Formochlorhydrin, of which the following is a specification.

My invention relates to improvements in a process for preparing ethylene chlorhydrin $CH_2OH$—$CH_2Cl$ and it consists in the steps hereinafter described.

In the preparation of ethylene chlorhydrin as usually conducted, gaseous hydrochloric acid is passed into ethylene glycol $CH_2OH$—$CH_2OH$ heated to a temperature equal to the boiling point of ethylene chlorhydrin 128° C. or slightly in excess of that figure.

The present invention has for its main object to provide a process by means of which ethylene chlorhydrin may be more economically prepared due to the fact that higher yields are effected by my improved process.

In making this compound, the new compound ethyl formochlorhydrin is formed.

I have found that the substance known as ethylene chlorhydrin may be obtained by the action of alcohol upon ethylene acetochlorhydrin $CH_2Cl$—$CH_2CH_3COO$ or ethylene monoformochlorhydrin $CH_2Cl$—$CH_2OOCH$. Obtained in either of these ways it is a colorless liquid boiling at 120° centigrade and having the well known characteristics of that substance.

In carrying out my process, I submit the ethylene acetochlorhydrin or formochlorhydrin to the action of alcohol containing a small amount of dry gaseous hydrochloric acid in solution, preferably 1 to 2 per cent by weight. For example glycol diformate $CH_2HCOO$—$CH_2HCOO$ which is easily obtained by a number of well known methods, is saturated with dry hydrochloric acid gas at a temperature of 100° C. or slightly in excess of that temperature. The liquid so obtained is washed with ice water and dried by means of calcium chloride. The dried liquid is then subjected to fractional distillation and that part which distils over, and contains the formochlorhydrin, is collected separately. This portion being weighed, there is added to it an excess, according to the following equation of methyl alcohol containing 1 to 2% of dry gaseous hydrochloric acid in solution.

$$HCOO.CH_2CH_2Cl + CH_3OH =$$
$$CH_2OH—CH_2Cl + HCOOCH_3$$

This mixture is heated, to gentle boiling, for about fifteen minutes or more under a reflux condenser.

The reaction mixture which is thus obtained is subjected to fractional distillation. The methyl formate formed in this case distils over first, followed by the excess alcohol. That fraction coming over later at 125°–128° centigrade is kept separate as it is nearly pure ethylene chlorhydrin.

Ethylene acetochlorhydrin can be obtained from ethylene monoacetate in an analogous manner. As a result of this process I am able to obtain ethylene chlorhydrin from ethylene acetochlorhydrin or ethylene monoformochlorhydrin in much better yields than it can be obtained by the use of gaseous hydrochloric acid and ethylene glycol, as stated above.

It is obvious that the invention includes a new composition of matter which may be described as follows: the formochlorhydrin of ethylene or 2 chlor ethyl formate $HCOO.CH_2$—$CH_2Cl$ a colorless mobile liquid difficultly soluble in ice water and having a specific gravity of 1.17 at 16° C. and a boiling point of 94° C. at 760 mm.

I claim:—

As a new compound: ethylene formochlorhydrin or 2 chlor ethyl formate ($CH_2COOH$—$CH_2Cl$) a colorless mobile liquid difficultly soluble in ice water and having a specific gravity of 1.17 at 16° C. and a boiling point of 94° C. at 760 mm.

FOORD VON BICHOWSKY.